3,528,201
LOW TEMPERATURE APPARATUS FOR
DEFLASHING MOLDED ARTICLES
Robert D. Jones, Allentown, and David J. Klee, Emmaus,
Pa., assignors to Air Products and Chemicals, Inc.,
Allentown, Pa., a corporation of Delaware
Original application Oct. 25, 1966, Ser. No. 589,457, now
Patent No. 3,468,077, dated Sept. 23, 1969. Divided and
this application Feb. 28, 1969, Ser. No. 828,035
Int. Cl. B24b 31/02
U.S. Cl. 51—164      12 Claims

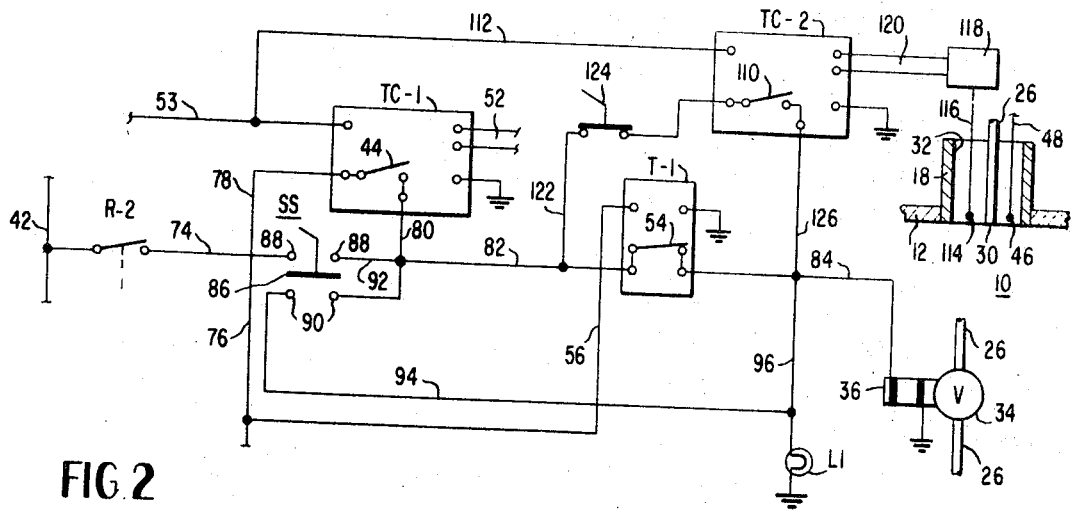
FIG. 2
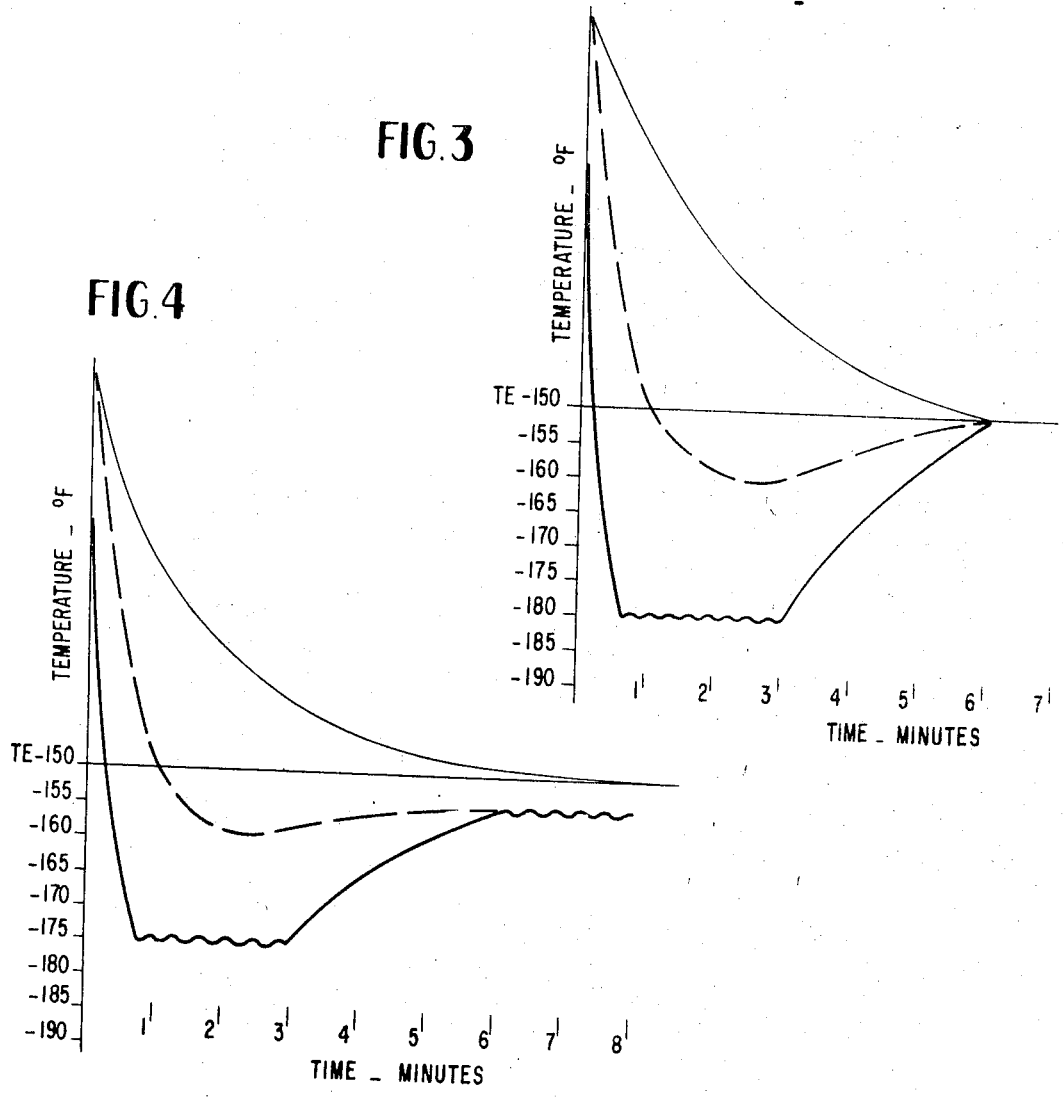
FIG. 3
FIG. 4

United States Patent Office 3,528,201
Patented Sept. 15, 1970

ABSTRACT OF THE DISCLOSURE

Apparatus for low temperature deflashing of resilient articles including a drum tumbler with both timber means and temperature sensing means controlling the introduction of coolant into the drum.

---

This application is a division of application 589,457, filed Oct. 25, 1966 and now Pat. No. 3,468,077, dated Sept. 23, 1969.

This invention relates to improvements on low temperature methods of and apparatus for deflashing articles formed from normally resilient material.

Processes are known in the art for the deflashing of articles by low temperature cooling of the articles to the embrittlement temperature of the material from which the articles are molded, and then subjecting embrittled flash to physical forces to break the embrittled flash from the bodies of the articles. Successful performance of such low temperature deflashing processes requires selective embrittlement of the flash, that is, the flash being quite thin as compared with the bodies of the articles, must become completely embrittled so that it may be broken away from the bodies by applied forces, but embrittlement of the bodies of the articles must be prevented or minimized since embrittlement or excessive embrittlement of the bodies would result in breakage or other damage to the bodies under the forces applied to break the flash from the bodies. Hence, as used herein, the term "selective embrittlement of the flash" refers to a condition in which the flash on the article is completely embrittled, but the body of the article is not embrittled or its embrittlement is minimized to prevent damage to the bodies as a result of the deflashing forces.

Difficulties have been experienced in the past when attempting to reliably achieve selective embrittlement of the flash in commercial operations and at the same time complete the deflashing within a short period of time and with minimum use of refrigeration to attain the low temperatures required. These difficulties have increased due to the use of new synthetic materials in forming molded articles which may be processed by low temperature deflashing operations. For example, synthetic materials having relatively low embrittlement temperatures within the range of —125° F. to —225° F., such as silicone rubbers, require the use of lower temperature refrigerants and make it more difficult to accurately obtain and reliably maintain the critical low temperature required to establish "selective embrittlement of the flash" of articles molded from such materials. Furthermore, low temperature deflashing is being employed to process an ever increasing variety of molded articles not only with respect to composition but also with respect to shape and size of the article, the flash and the body. Accordingly, economical operation requires the obtaining of a wide range of critical temperatures to establish selective embrittlement of the flash and a wide range of mechanical deflashing periods which must be properly correlated in order to obtain optimum efficiency.

Accordingly, it is an object of the invention to provide a novel apparatus for low temperature deflashing of articles.

Another object is the provide a novel process of and apparatus for low temperature deflashing of articles which make it possible to effect the deflashing operation within a relatively short period of time without damage to the bodies of the articles.

Another object of the invention is to provide a novel apparatus for controlling low temperature deflashing operations.

Still another object is to provide a novel apparatus that is capable of controlling a number of different modes of low temperature deflashing operations.

Other objects and features of the invention will appear more fully from the following description considered in connection with the accompanying drawings which disclose several embodiments of the invention. It is to be expressly understood, however, that the drawings are designed for purposes of illustration only and not as a definition of the limits of the invention, reference for the latter purpose being had to the appended claims.

In the drawings, in which similar reference characters denote similar elements throughout the several views:

FIG. 2 is a diagrammatic showing of a modified control apparatus provided by the invention;

FIG. 3 is a schematic representation of temperature profile curves of a low temperature deflashing process provided by the present invention;

FIG. 4 is a schematic illustration of temperature profile curves of another low temperature deflashing process provided by the present invention;

Figure 1:
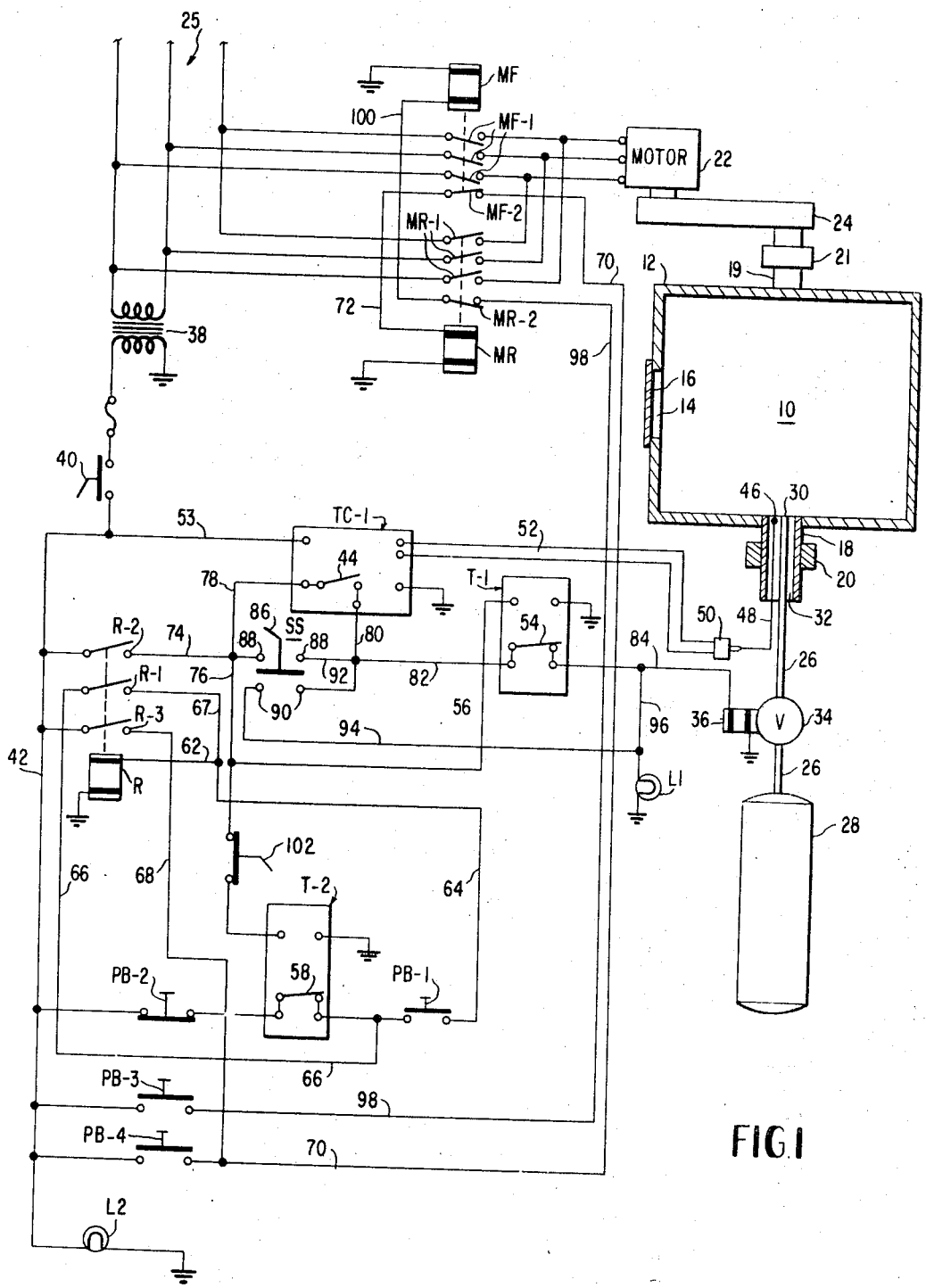
FIG. 1 is a diagrammatic showing, partly in section, of a low temperature deflashing system embodying novel control apparatus provided by the invention.

A novel low temperature deflashing control apparatus provided by the present invention is shown in FIG. 1 in combination with mechanical deflashing equipment of the tumbler type including a chamber 10 defined by drumlike tumbler 12 shown in horizontal cross section. While the present invention is disclosed in combination with mechanical deflashing equipment of the drum tumbler type, it is to be expressly understood that the novel control apparatus may be used to control other types of mechanical deflashing means, that is, equipment for imparting forces for breaking flash from the bodies of the articles including shot peening and vibrating equipment. The articles to be deflashed are placed in the chamber 10 through opening 14 provided with a suitable cover 16. The tumbler 12 is supported on shafts 18 and 19 rotatable in bearings 20 and 21, respectively, supported on suitable framework not shown. The tumbler 12 is rotated to impart a tumbling action to the articles to be deflashed by means of motor 22 connected to shaft 19 through a variable speed unit 24. Power is supplied to motor 22 from a three phase source indicated by electrical lines 25 through contacts MF–1 or contacts MR–1 respectively controlled by relays MF and MR which also control contacts MF–2 and MR–2, respectively.

As mentioned above, the control apparatus provided by the present invention is designed for control of low temperature deflashing by use of a liquid refrigerant, preferably liquid nitrogen and, accordingly, means are provided for injecting liquefied normally gaseous refrigerant into the chamber 10. As shown, such means include refrigerant supply conduit 26, leading from any suitable source of liquid refrigerant such as container 28, which passes through a longitudinal opening in shaft 18 and terminates within chamber 10 in a spray orifice 30. The conduit 26 is spaced radially from the inner periphery of the opening in shaft 18 to provide an annular passageway 32 for the venting of vaporized refrigerant from the chamber. Valve means 34, operated by solenoid 36, is provided in conduit 26 for controlling the flow of refrigerant into the chamber 10.

The control apparatus provided by the present invention includes a temperature controller TC–1; a temperature timer T–1; a mechanical deflashing means timer T–2; contacts R–1, R–2 and R–3 controlled by relay R; three-position selector switch SS; pushbutton start switch PB–1; pushbutton stop switch PB–2; and, forward and reverse jog switches PB–3 and PB–4, respectively. Power for the control apparatus is supplied from transformer 38 having a connection through switch 40 to high potential conductor 42.

The temperature controlled TC–1 may be of conventional design and includes a control element in the form of a switch 44 which opens and closes responsively to temperature of the chamber 10 by means of a thermocouple 46 located within the chamber and connected by lead 48, transmitting device 50 and leads 52 to the temperature controller TC–1. The temperature controller TC–1 is provided with means, not shown, to predetermine and set the temperature at which it responds to thereby maintain the chamber 10 at such predetermined temperature and is fed with energizing current by way of conductor 53. Timer T–1 also may be of conventional design and includes a control element in the form of a switch 54. Upon initiation of operation of the timer T–1, the switch 54 is maintained in closed position for a predetermined time interval and thereupon moved to open position; the period of the predetermined time interval being adjustable. Energizing current to initiate operation of the timer T–1 is supplied by conductor 56 in a manner described below. The timer T–2 may be similar to the timer T–1 and includes a control element in the form of a switch 58 which is maintained in closed position for a predetermined time interval after initiation of its operation and then moved to open position. The predetermined time interval is adjustable and energizing current to initiate operation of the timer T–2 is supplied through conductor 60. The contacts R–1, R–2 and R–3 are normally open as shown and are simultaneously moved to closed position upon energization of the relay R. The contact R–1 completes a holding circuit for the relay R; the contact R–2 completes a circuit for supplying energizing current to the timers T–1 and T–2 and also completes an energizing circuit for solenoid 36 for operating the control valve 30; and the contact R–3 completes a circuit for supplying current to the motor 22.

The energizing circuit for the relay R includes conductors 62, 64 and serially connected, normally open start switch PB–1, normally closed switch 58 of timer T–2, and normally open stop switch PB–2 connected to conductor 42. Accordingly, upon closing of the start switch PB–1, the relay R is energized causing simultaneous closing of contacts R–1, R–2 and R–3. Closing of contact R–1 completes a holding circuit for the relay R through normally closed switches PB–2 and 58, conductor 66, contact R–1 and conductors 67 and 62, to maintain the relay R energized until either switch PB–2 or 58 is moved to open position. Closing of contact R–3 completes an energizing circuit for relay MR by way of conductors 68 and 70, normally closed contact MF–2 and conductor 72 to move the contacts MR–1 to closed position and supply power to the motor 22 to effect rotation of the tumbler 12 in one direction which is arbitrarily designated the reverse direction. Closing of contact R–2 completes a circuit between conductor 42, by way of conductors 74 and 76, to conductors 56 and 60 to initiate operation of timing devices T–1 and T–2. Closing of contact R–2 also completes a connection between conductor 42 and the energizing circuit of the valve 30; the energizing circuit including conductors 74 and 78 connected between contact R–2 and switch 44, conductors 80 and 82 connected between switches 44 and 54 and conductor 84 connected between switch 54 and solenoid 36. The selector switch SS includes a movable member 86 normally in the position shown and adapted to be moved to a second position to form a connection between contacts 88, 88 and to a third position to form a connection between contacts 90, 90. When the movable member 86 is moved to the second position, a direct circuit is formed between conductor 74 and switch 54 by way of conductor 92, and when the member 86 is moved to the third position, a direct circuit is formed between switch 44 and solenoid 36 by way of conductors 94 and 96. Normally open switch PB–3, when closed, forms an energizing circuit for the relay MF by way of conductor 98, contact MR–2 and conductor 100, whereas the switch PB–4, when closed, forms an energizing circuit for relay MR through conductor 70, contact MF–2 and conductor 72. The switches PB–3 and PB–4 are provided for jogging the drum 12 in one direction or the other to properly position the opening 14 to permit introduction and removal of articles from the chamber 10. During normal operation, actuation of switches PB–3 and PB–4 would have no effect since, during normal operation, the contact MR–2 would be open thus immobilizing the energizing circuit to the relay MF. Manually operable switch 102 is provided to permit certain operations independently of the timer T–2 and lights L–1 and L–2 are provided to indicate energization of the refrigerant control valve 30 and power supply to the control apparatus, respectively.

The modified control apparatus shown in FIG. 2 of the drawings includes the elements of the apparatus of FIG. 1 described above and, in addition, embodies a second temperature controller TC–2. Only those portions of the control apparatus of FIG. 1 are shown in FIG. 2 as are necessary to illustrate the relationship of the temperature controller TC–2 therewith. The temperature controller TC–2 may be similar to the temperature controller TC–1 and includes a control element in the form of a switch 110 which opens and closes responsively to deviations in the temperature of the chamber 10 relative to a predetermined temperature value set by adjustment of the temperature controller TC–2. The temperature controller TC–2 is supplied with energizing current through conductor 112 and operates responsively to the temperature within the chamber 10 by means of thermocouple 114 located within the chamber and connected by 116, transmitting device 118 and leads 120 to the temperature controller TC–2. The switch 110 is connected in shunt with switch 54 of the timer T–1; one side of the switch 110 being connected to conductor 82 by conductor 122 including manually operable switch 124 and the other side of the switch 110 being connected by conductor 126 to conductor 84.

The present invention provides novel processes of low temperature deflashing of articles which make it possible to complete the deflashing operation within a short period of time and with a substantial reduction in refrigeration costs, as compared to prior processes, while obtaining complete deflashing of the articles without marring or otherwise defacing the bodies of the articles. The novel processes may be practiced in the deflashing of a wide variety of shapes and sizes of articles formed from all presently employed materials including synthetic materials which possess relatively low embrittlement temperatures. Any refrigerant inert to the material forming the articles and capable of maintaining a temperature of at least 40° F. below the embrittlement temperature of the material may be utilized. However, it is preferable to employ as the refrigerant liquefied normally gaseous materials having low normal boiling points to obtain fully the advantages provided by the novel processes. Liquefied argon and nitrogen are ideal refrigerants and nitrogen is preferred in view of its relatively low cost.

The preferred process provided by the present invention includes the steps of (1) rapidly introducing into a chamber containing articles to be deflashed a quantity of refrigeration to abruptly decrease the temperature of the chamber to a predetermined temperature below the embrittlement temperature of the material forming the articles while initiating a mechanical deflashing operation on the articles, (2) of maintaining the temperature of the chamber at the predetermined temperature by controlled introduction of refrigeration into the chamber for a first predetermined time interval while continuing the mechanical deflashing operation, and (3) at the termination of the first predetermined time interval terminating introduction of refrigeration into the chamber while continuing the mechanical deflashing operation for a second predetermined time interval during which the chamber is warmed to a temperature approaching the embrittlement temperature of the material forming the articles. The temperature below the embrittlement temperature to which the chamber is initially cooled and the time interval during which the chamber is maintained at such temperature as well as the time interval during which the mechanical deflashing operation is performed without adding refrigeration to the chamber depends upon the size, shape and composition of the articles being deflashed including the size and shape of the flash relative to the bodies of the articles. In general, the chamber may be initially reduced to a temperature of about 20° F. to 40° F. below the embrittlement temperature of the material and, by the use of a low boiling point refrigerant such as liquid nitrogen, the chamber may be rapidly cooled to such sub-embrittlement temperature within one minute after initiation of the process. Also, the total time of refrigeration introduction, i.e., the initial rapid introduction of the refrigerant and the interval during which the refrigerant is controllably introduced to maintain the chamber at the desired sub-embrittlement temperature, is less than the time interval during which the mechanical deflashing operation is performed in the absence of refrigeration introduction.

A specific operating example of the preferred process is described with reference to FIG. 3 of the drawings which illustrates the relative temperatures of the chamber, the flash and the body during the total period of the process. In FIG. 3, the ordinate represents temperature and the abscissa represents time; TE indicates the embrittlement temperature of the material forming the articles; the continuous heavy curve shows the chamber temperature; the broken curve shows the temperature of the flash; and, the continuous light curve shows the temperature of the body. In the example, the mechanical deflashing operation is performed by tumbling in a rotating drum although the process is equally applicable to other mechanical deflashing operations, and liquid nitrogen is used as the refrigerant. The articles to be deflashed are molded from an ethylene-propylene-terpolymer compound having an embrittlement temperature of about −150° F. and are in the form of sheets including a large number of spark plug "boots" comprising the bodies of the article to be produced as product; the bodies being interconnected by relatively thin membranes comprising flash. After the chamber of the drum was filled with a load of such sheets of the articles, rotation of the drum was initiated and liquid nitrogen was introduced into the chamber and, within less than one minute following the beginning of the process, the temperature of the chamber was cooled to about −180° F. Thereafter, liquid nitrogen was controllably introduced into the chamber to maintain the temperature of the chamber at about −180° F. for a first time interval terminating about three minutes after the process was initiated. At termination of the first time interval, injection of liquid nitrogen into the chamber was terminated and the chamber warmed to about the embrittlement temperature of about −150° F. during an ensuing second time interval of about three minutes during which rotation of the drum was continued. Upon termination of the second time interval, rotation of the drum was stopped and the process was completed. As seen from FIG. 3, the temperature of the flash was rapidly decreased and, after about one minute of operation, at least the extremities or portions of the flash of small cross-sectional area were cooled to below the embrittlement temperature and mechanical deflashing commenced; prior rotation of the drum assured uniform cooling of all articles in the drum. As the process continued, the temperature of the flash was further reduced to about −160° F., reaching a maximum temperature of about 10° F. below the embrittlement temperature, at about three minutes after initiation of the process. Thereafter, during the last three minutes of the process, when liquid nitrogen was not introduced into the chamber, the temperature of the flash gradually increased from the maximum low temperature to approach the embrittlement temperature upon completion of the process. The obtaining of the low temperature of the flash of about 10° F. below the embrittlement temperature at about three minutes after initiation of the process and the maintaining of the flash below the embrittlement temperature throughout the remaining period of the process effected complete removal of flash from the bodies of the articles in a process time of about six minutes. As also seen from FIG. 3, the temperature of the bodies of the articles was gradually cooled during the process from about ambient temperature to approach the embrittlement temperature at termination of the process. Hence, no part of the bodies was cooled to such a low temperature as to be affected by the forces produced by the mechanical deflashing operation.

An important advantage of the foregoing process is the obtaining of deflashed bodies within an extremely short process period. The foregoing advantages result from the discovery that, by proper correlation of temperature and time, it is possible to rapidly cool the total flash and effect embrittlement of the total flash and hence obtain flash removal by deflashing of substantially total flash. The importance of the foregoing concept will be appreciated by considering a prior process in which the flash is subjected to a temperature environment only slightly below the embrittlement temperature throughout the process. Due to the small temperature differences, a relatively long time interval is required to cool the total flash to the embrittlement temperature and a relatively long time interval is provided merely for cooling of the total flash to the embrittlement temperature. Also, although such prior process attempts to operate on the selective embrittlement principle, the long time ordinarily results in cooling the body to below the embrittlement temperature with resulting damage to the bodies by the mechanical deflashing forces. Of course, with the prior process, when the flash is of varying cross-sectional area, parts of the flash will be cooled to the embrittlement temperature before other parts and the deflashing operation will be a gradual removal of the flash. In the process according to the present invention, on the other hand, substantially the total flash is removed during the period of the process when the flash is deeply cooled to below the embrittlement temperature and remaining parts of the flash are removed during the terminating period of the process when deep sub-embrittlement temperatures are not required due to the shape and size of the remaining flash. The degree of cooling of the chamber below the embrittlement temperature determines the maximum sub-embrittlement temperature of the flash and hence the latter depends upon the size and shape of the flash and also on the relative size and shape of the body. For the processing of typical articles, the maximum sub-embrittlement temperature of the flash may vary from about 50 F. to about 20° F. below the embrittlement temperature.

The present invention also provides a modified low temperature deflashing process which embodies the novel concepts of the preferred process described above and includes the step of maintaining the temperature of the chamber at a predetermined value below the embrittlement temperature for a relatively short time interval prior to termination of the process. The modified process includes the steps of (1) rapidly introducing refrigerant to abruptly cool the chamber to a predetermined low sub-embrittlement temperature, (2) maintaining the chamber at the predetermined low temperature for a first predetermined time interval, (3) terminating refrigeration introduction and allowing the chamber to warm to a second predetermined temperature below the embrittlement temperature, (4) maintaining the chamber at the second predetermined temperature for a second predetermined time interval, (5) terminating the process at the end of the second predetermined time interval, and (6) starting the mechanical deflashing operation in synchronism with step (1) and continuing the mechanical deflashing operation until the process is terminated. The modified process has particular utility in the deflashing of articles in which the relative differences in the cross-sectional area of the flash and the bodies does not permit deep cooling of the chamber below the embrittlement temperature and thereby providing insufficient refrigeration to complete the deflashing operation according to the preferred process of FIG. 3. In the modified process therefore, the chamber is cooled to a less degree below the embrittlement temperature as compared to the preferred process, for example about 20° F. to 35° F. below the embrittlement temperature, and the chamber is maintained at about 5° F. below the embrittlement temperature during the final phase of the process.

The foregoing will be more fully understood from the following specific example considered in connection with FIG. 4 of the drawings which illustrate the temperatures of the chamber, the body and the flash in the manner of FIG. 3 as described above. The articles were similar to the articles of the FIG. 3 example except less difference existed between the cross-sectional areas of the flash and the body; liquid nitrogen refrigeration was employed and the mechanical deflashing operation was performed by tumbling of the articles in a drum-like container. As seen from FIG. 4, the chamber was initially cooled to about −175° F., to about 25° F. below the embrittlement temperature, held at such temperature until termination of three minutes of the process and then the chamber was warmed while the tumbling continued for the next three minutes at which time the chamber was warmed to about 5° F. below the embrittlement temperature. Refrigeration was then controllably added to the chamber to maintain the chamber at about 5° F. below the embrittlement temperature throughout the final two minutes of the process. It will also be seen from FIG. 4 that the temperature of the flash was reduced in a manner substantially similar to the preferred process of FIG. 3 except that the flash when warmed to about 5° F. below the embrittlement temperature was then held at about that temperature until completion of the process. Since the chamber was initially cooled to a low temperature above the initial cooling of the chamber according to the preferred process, after passing of six minutes of the process the chamber was at a lower temperature as readily seen from a comparison of FIGS. 3 and 4. Also, since less refrigeration was initially introduced into the chamber, the period of the modified process was sightly longer than the period of the preferred process. However, the longer process period of the modified process is not a real disadvantage since the modified process is capable of effecting deflashing of delicate articles within a total period which is short as compared to prior processes. Also, as seen from a comparison of FIGS. 3 and 4, throughout the modified process the body was gradually cooled to a temperature closer to the embrittlement temperature, the body temperature was at all times maintained above the embrittlement temperature and was not deeply cooled so as to be affected by the forces of the mechanical deflashing operation.

The novel control apparatus illustrated in FIG. 1 of the drawings is designed for and is capable of controlling low temperature deflashing operations according to the preferred process illustrated in FIG. 3 while the modified control apparatus of FIG. 4 is designed for and is capable of controlling a low temperature deflashing operation according to the modified process of FIG. 4. When utilizing the control apparatus of FIG. 1 to perform the preferred process of FIG. 3, the temperature controller TC–1 is set to respond to a temperature of −180° F., the timer T–1 is set to open the switch 54 after a time interval of three minutes and the timer T–2 is set to open the switch 58 after a time interval of six minutes. Upon closing of the switch 40, the temperature controller TC–1 is energized and, due to the high temperature of chamber 10, the switch 44 will move to closed position. Upon closing the start switch PB–1, the relay R is energized closing contacts R–1, R–2 and R–3 and simultaneously effecting the following operations:

(1) closing of contact R–1 establishes a holding circuit for relay R (2) closing of contact R–2 energizes the timer T–1 through conductor 56 and timer T–1 begins to measure its preset three minute time interval (3) closing of contact R–2 energizes the timer T–2 through conductor 60 and timer T–2 begins to measure its preset six minute time interval (4) closing of contact R–2 completes the energizing circuit for the solenoid 36 of the refrigerant valve 34 through closed switches 44 and 54 to effect opening of the valve 34 and rapid introduction of refrigerant from source 28 into the chamber.

(5) closing of contact R–3 effects closing of contacts MF–1 to feed power to motor 22 and begin rotation of the drum 12, that is, to initiate the mechanical deflashing operation.

Refrigeration will flow into the chamber 10 until the temperature of the chamber drops to −180° F. and the switch 44 will then open to interrupt the energizing circuit of the solenoid and effect closing of valve 34. The temperature controller TC–1 functions responsively to the temperature in the chamber to control valve 34 and maintain the chamber at about −180° F. until the three minute time interval set by timer T–1 runs out at which time the switch 54 is opened to interrupt the energizing circuit of the solenoid 36. Thereafter, the drum 12 continues to be rotated without refrigeration being introduced into the chamber and the chamber temperature increases until the six minute time interval set by the timer T–2 runs out. At the latter time, the switch 58 moves to open position thereby effecting terminating energization of relay MR and stopping rotation of the drum and terminating the process. As mentioned above, the temperature controller TC–1 may be adjusted to respond to a range of temperatures and the timers T–1 and T–2 may be adjusted to effect operation of their control element switches 54 and 58, respectively, at different time intervals following energization. Such adjustments make it possible to establish the optimum sub-embrittlement temperature of the chamber, the optimum time interval the chamber is maintained at such sub-embrittlement temperature and the optimum time interval the mechanical deflashing operation is performed in the absence of refrigeration introduction, for any given article when considering the composition of the article and the relative size and shape of the body and the flash.

When operating the control apparatus of FIG. 2 to perform the modified process of FIG. 4, the temperature controller TC-1 and the timers T-1 and T-2 are adjusted in the manner discussed above in connection with the apparatus of FIG. 1. In addition, the temperature controller TC-2 is set at a predetermined temperature below the embrittlement temperature and above the temperature determined by the temperature controller TC-1. Upon closing of the switch 40, the temperature control TC-1 and the temperature control TC-2 are energized and then control element switches 44 and 110, respectively, move to closed position due to the high temperature existing in the chamber 10. Upon closing of the start switch PB-1, the apparatus responds in the manner described above in connection with FIG. 1 with the energizing circuit for the solenoid 36 being interrupted upon opening of the switch 54 when the three minute time interval set by the timer T-1 is reached. During the initial three minute time interval, the switch 110 will move to open position when the temperature of the chamber is reduced to below the temperature to which the temperature control TC-2 is set and the switch 110 will remain in open position throughout the time interval set by the timer T-1. After termination of the three minute interval set by the timer T-1, the drum 12 will continue to rotate under the control of timer T-2 and the chamber temperature will gradually increase. When the chamber temperature increases to the temperature value set by the temperature control TC-2, the control element switch 110 moves to closed position and establishes an energizing circuit for the solenoid 36 which includes closed switch 44 and the closed switch 110. Thereafter, the temperature control TC-2 functions to maintain the chamber at substantially the temperature set by the temperature control TC-2 until the eight minute time interval set by timer T-2 expires and effects termination of the process. The temperature to which the temperature control TC-2 responds is adjustable to establish an optimum temperature for any given article.

Figure 5:
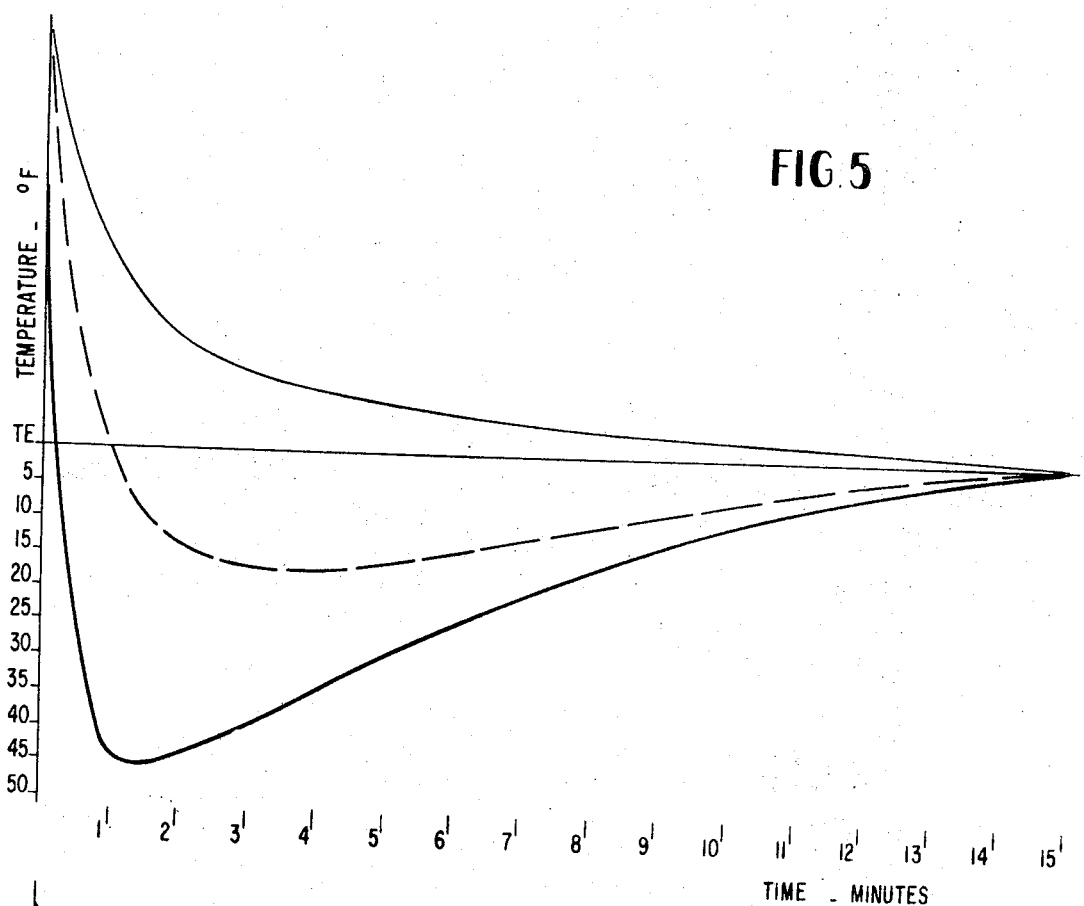
FIG. 5 is a schematic showing of temperature profile curves of a low temperature deflashing process according to the prior art.
Figure 6:
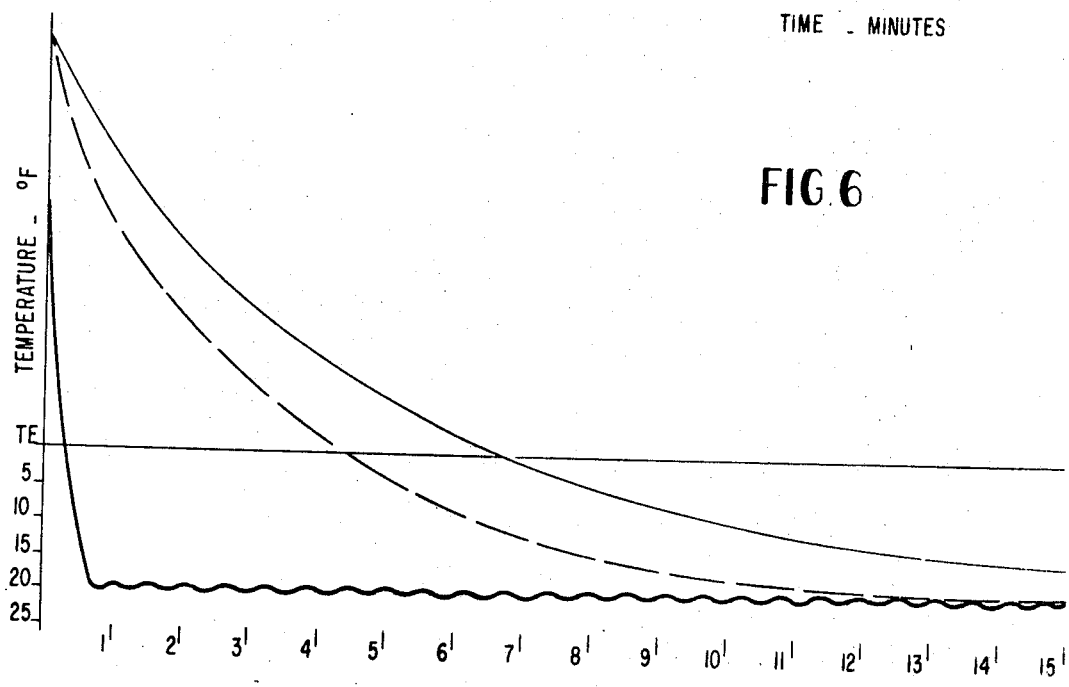
FIG. 6 is a schematic illustration of temperature profile curves of another low temperature deflashing process provided by the prior art.

As mentioned above, one of the objects of the present invention is to provide novel control apparatus which may be employed to control different low temperature deflashing processes. In this regard, it will be appreciated that the control apparatus shown in FIG. 2 may be utilized for controlling the preferred process of FIG. 3 by setting the temperature controller TC-2 to respond to a low temperature that will not be reached during normal operation of the process or by opening the manually operable switch 124. Either adjustment will effectively remove the temperature controller TC-2 from the apparatus and the apparatus would then operate in a manner similar to the control apparatus shown in FIG. 1. In addition, the selectively operable switch SS makes it possible to adjust the control apparatuses of FIGS. 1 and 2 for controlling low temperature deflashing processes which operate in accordance with modes different from the novel processes provided by the present invention. For example, with reference to FIG. 1, when the selective switch SS is moved to its second position to form a connection between the contacts 88, 88, the temperature controller TC-1 is effectively removed from the energizing circuit of the solenoid 36 and, upon closing of the contact R-2, the energizing circuit would be under sole control of switch 54 of the timer T-1. The timer T-1 would be set to maintain the switch 54 closed for a predetermined time interval after initiation of the process such as one minute, for example, during which time interval the valve 34 would be open and refrigerant would flow into the chamber 10. After termination of the time interval set by the timer T-1, there would be no further introduction of refrigerant into the chamber and the chamber would warm throughout the tumbling period determined by the setting of the timer T-2. Such control would result in a low temperature deflashing process as illustrated in FIG. 5 which shows the temperature curves of the chamber, the flash and the body in the manner similar to FIGS. 3 and 4 except the numerical temperature values indicate temperatures below the embrittlement temperature TE. When the selective switch SS is moved to its third position to establish a connection between contacts 90, 90, the energizing circuit of the solenoid 36 would include the switch 44 of temperature controller TC-1 but would exclude the switch 54 of the timer T-1 thus rendering control of the valve 34 dependent solely upon the temperature of the chamber 10. Thus, with the selective switch SS in its third position, valve 34 would open upon initiation of the process and refrigeration would be introduced into the chamber 10 to cool the chamber to the temperature set by the temperature controller TC-1 and thereafter the temperature controller TC-1 would function to maintain the chamber at that temperature throughout the tumbling period determined by the timer T-2. Such adjustment of the control apparatus results in a low temperature deflashing process illustrated in FIG. 6 of the drawings wherein the sub-embrittlement temperatures and the temperature curves of the chamber, the flash and the body are depicted in a manner similar to FIG. 5. In the control apparatus shown in FIG. 2 when the selective switch SS is moved to its second position to effectively remove the temperature controller TC-1 from the energizing circuit of the solenoid 36, the temperature controller TC-2 is also effectively removed from such energizing circuit by either opening the manual switch 124 or by setting the temperature controller TC-2 to respond to an extremely low temperature and thus maintain the switch 110 in open position throughout the process, to thereby obtain a low temperature deflashing process as depicted in FIG. 5. As an alternate novel mode of operation, the manual switch 124 may be closed and the temperature controller TC-2 set to respond to a temperature slightly below the embrittlement temperature. With such adjustments, refrigeration will be introduced into the chamber during a time interval set by the timer T-1 to cool the chamber to a low sub-embrittlement temperature, the temperature of the chamber will then gradually increase until the temperature value set by the temperature controller TC-2 is reached and thereafter, throughout the remainder of the tumbling time determined by the timer T-2, the temperature controller TC-2 will function to maintain the temperature of the chamber at the preset temperature. With further reference to the control apparatus of FIG. 2, when the selective switch SS is moved to its third position to form a connection between contacts 90, 90, the control apparatus will operate in a manner similar to the control apparatus of FIG. 1 when similarly adjusted as described above providing the manual switch 118 is opened or the temperature controller TC-2 is set to respond to a temperature equal to or higher than the temperature to which the temperature controller TC-1 is set. The feature of the present invention of providing control apparatus capable of adjustment to effect control of a number of different low temperature deflashing processes makes it possible to obtain optimum deflashing timewise, of an extremely wide variety of articles with respect to composition and relative size of flash and body. The deflashing operations depicted in FIGS. 5 and 6 have useful application in the deflashing of articles formed of relatively high embrittlement temperature material and consisting of bodies which are large relative to the flash since selective embrittlement of the flash may be reliably obtained with relative ease.

Although several novel low temperature deflashing processes and control apparatuses have been provided by the present invention, it is to be expressly understood that various changes and substitutions may be made therein without departing from the spirit of the invention as well understood by those skilled in the art. For example, as mentioned above, although the control apparatuses provided by the present invention are disclosed in combination with a rotating drum for producing a mechanical deflashing operation, it is to be understood that the control apparatuses are equally useable with other types of mechanical deflashing equipment and, although the control apparatuses are disclosed as being of the electrical type, it will be appreciated that pneumatic or hydraulic control arrangements may be employed. Accordingly, the term "energizing circuit," as embodied in the ensuing claims, is not restricted to electrical energizing circuits but is intended to embody other types of energizing circuits. Reference therefore will be had to the appended claims for a definition of the limits of the invention.

What is claimed:

1. Apparatus for low temperature deflashing of articles formed from normally resilient material comprising:
   means defining a chamber adapted to hold articles to be deflashed,
   mechanical deflashing means associated with the chamber for removing flash from articles in the chamber,
   a source of liquid refrigerant,
   valve means for introducing liquid refrigerant from the source into the chamber,
   means for initiating operation of the mechanical deflashing means and for maintaining the mechanical deflashing means in operation for a first predetermined time interval,
   means operating at least in part responsively to the temperature of the chamber for controlling the valve means to introduce a quantity of refrigerant into the chamber and cool the chamber to a first predetermined temperature and to maintain the chamber at said predetermined temperature for a second predetermined time interval,
   means for synchronously initiating the beginning of the first predetermined time interval and the second predetermined time interval,
   means for selectively adjusting the period of the first predetermined time interval,
   and means for selectively adjusting the period of the second predetermined time interval within a range less than the period of the first predetermined time interval.

2. Apparatus as defined in claim 1 including
   means for controlling the valve means to introduce refrigerant into the chamber and maintain the temperature of the chamber at a second predetermined temperature higher than the first predetermined temperature during a time period between termination of the first predetermined time interval and the second predetermined time interval.

3. In combination,
   means defining a chamber adapted to hold articles formed of normally resilient material,
   mechanical deflashing means operatively associated with the chamber for removing flash from articles in the chamber,
   means including a valve for introducing refrigerant into the chamber,
   and control apparatus for the mechanical deflashing means and the valve,
   the control apparatus comprising:
      means including a first timing device for initiating operation of the mechanical deflashing means and for maintaining the mechanical deflashing means in operation for a first predeterimned time interval following initiation of operation of the first timing device,
      means forming an energizing circuit for the valve including a temperature control device and a second timing device,
      the temperature control device including a control element and means for opening and closing the control element thereof responsively to variations in the temperature of the chamber relative to a predetermined temperature determined by the temperature control device,
      the second timing device including a control element and means for opening the control element thereof after a second predetermined time interval following initiation of operation of the second timing device,
      selectively operable means for selectively connecting the control element of the temperature control device and for selectively connecting the control element of the second timing device in the energizing circuit,
      means for initiating operation of the first timing device,
      and means for initiating operation of the second timing device.

4. Apparatus as defined in claim 3 including:
   means for synchronously initiating operation of the first timing device and the second timing device.

5. Apparatus as defined in claim 4 in which:
   the temperature control device includes means for selectively varying the predetermined temperature,
   the first timing device includes means for selectively varying the first predetermined time interval,
   and the second timing device includes means for selectively varying the second predetermined time interval.

6. Apparatus as defined in claim 5 including:
   means for immobilizing the energizing circuit responsively to operation of the first timing device to stop operation of the mechanical deflashing means upon termination of the first predetermined time interval.

7. Apparatus as defined in claim 5 in which:
   The selectively operable means includes means connecting the control element of the temperature control device and the control element of the second timing device in series in the energizing circuit.

8. Apparatus as defined in claim 7 including:
   means for effectively removing the control element of the second timing device from the energizing circuit, and
   means for effectively removing the control element of the second timing device from the energizing circuit.

9. Apparatus as defined in claim 3 including:
   a second temperature control device including a control element and means for opening and closing the control element thereof responsively to variations in the temperature of the chamber relative to a second predetermined temperature determined by the second temperature control device,
   and means for connecting the control element of the second temperature control device in the energizing circuit in series relation with the control element of the first temperature control device and in parallel relation with the control element of the second timing device.

10. Apparatus as defined in claim 9 including:
    means for adjusting the second predetermined temperature determined by the second temperature control device.

11. In combination:
    means defining a chamber for holding articles having flash to be removed,
    mechanical deflashing means operatively associated with said chamber for removing said flash,
    means for controlling the operation of said mechanical deflashing means,
    means including a valve for introducing refrigerant into said chamber,
    timer means for establishing selected time periods,
    temperature sensing means for sensing the temperature in said chamber, and
    an energizing circuit for operating said valve, said energizing circuit including a multiple position selector having one operative position for energizing said valve in response to said timer means and a different operative position for energizing said valve in response to said temperature sensing means.

12. The combination as claimed in claim 11 wherein said multiple position selector includes a further operative position for energizing said valve in response to both said timer means and said temperature sensing means.

References Cited

UNITED STATES PATENTS

| | | | |
|---|---|---|---|
| 2,682,732 | 7/1954 | Hanrahan | 51—164 |
| 2,996,846 | 8/1961 | Leliaert | 51—13 |
| 3,137,101 | 6/1964 | Leliaert | 51—13 |
| 3,160,993 | 12/1964 | McCormick | 51—314 X |
| 3,333,367 | 8/1967 | Salvaire | 51—164 |

HAROLD D. WHITEHEAD, Primary Examiner